(12) United States Patent
Steenblik et al.

(10) Patent No.: US 7,288,320 B2
(45) Date of Patent: Oct. 30, 2007

(54) MICROSTRUCTURED TAGGANT PARTICLES, APPLICATIONS AND METHODS OF MAKING THE SAME

(75) Inventors: Richard A. Steenblik, Alpharetta, GA (US); Mark J. Hurt, Duluth, GA (US); Michael E. Knotts, Roswell, GA (US); Brian S. Martin, Roswell, GA (US)

(73) Assignee: Nanoventions Holdings, LLC, Alpharetta, GA (US)

( * ) Notice: Subject to any disclaimer, the term of this patent is extended or adjusted under 35 U.S.C. 154(b) by 0 days.

(21) Appl. No.: 10/441,173

(22) Filed: May 19, 2003

(65) Prior Publication Data

US 2004/0067360 A1 Apr. 8, 2004

Related U.S. Application Data

(60) Provisional application No. 60/381,293, filed on May 17, 2002.

(51) Int. Cl.
*B32B 5/16* (2006.01)

(52) U.S. Cl. ...................... 428/403; 205/118
(58) Field of Classification Search ........... 428/402, 428/403; 205/118
See application file for complete search history.

(56) References Cited

U.S. PATENT DOCUMENTS

| | | | | |
|---|---|---|---|---|
| 4,131,064 A | * | 12/1978 | Ryan et al. ............... 102/293 |
| 4,243,734 A | * | 1/1981 | Dillon ............................ 430/8 |
| 4,329,393 A | * | 5/1982 | LaPerre et al. .............. 428/325 |
| 4,390,452 A | * | 6/1983 | Stevens .................... 252/408.1 |
| 5,411,799 A | | 5/1995 | Loving |
| 5,429,392 A | * | 7/1995 | Loving ......................... 283/72 |
| 5,974,150 A | * | 10/1999 | Kaish et al. ................. 713/179 |
| 6,132,873 A | * | 10/2000 | Dietz et al. .................. 428/404 |
| 6,432,715 B1 | * | 8/2002 | Nelson et al. ................. 436/56 |
| 6,455,157 B1 | * | 9/2002 | Simons ....................... 428/402 |
| 6,620,360 B1 | * | 9/2003 | Simons ....................... 264/132 |
| 6,647,649 B2 | * | 11/2003 | Hunt et al. ................... 40/326 |
| 6,919,009 B2 | * | 7/2005 | Stonas et al. ................. 205/74 |

FOREIGN PATENT DOCUMENTS

EP 0757830 * 12/1998

* cited by examiner

*Primary Examiner*—H T Le
(74) *Attorney, Agent, or Firm*—Todd Deveau; Thomas, Kayden, Horstemeyer & Risley LLP

(57) ABSTRACT

Microstructured taggant particles, their applications and methods of making the same are described. Precisely formed taggant particles can be formed, in the range of 500μ and smaller, from either inert polymers or biodegradable materials bearing information indicia, such as through specific shape, size, color, reflectivity, refractive index, surface geometry, imprinting, optical effect or properties, and electromagnetic properties, to uniquely tag, identify or authenticate articles.

9 Claims, 7 Drawing Sheets

(A)             (B)

(A)             (B)

MICROSTRUCTURED TAGGANT PARTICLES, APPLICATIONS AND METHODS OF MAKING THE SAME

RELATED APPLICATION

This application claims the benefit of and priority to U.S. Provisional Application Ser. No. 60/381,293 filed May 17, 2002.

BACKGROUND OF THE INVENTION

1. Field of the Invention

This invention relates to a method of manufacturing precisely formed taggant materials or particles of uniform size and information content, preferably formed from polymeric, protein, or carbohydrate materials. Specific combinations of shape, size, color, reflectivity, refractive index, surface geometry, imprinting, optical effect, and electromagnetic properties can be used to uniquely tag manufactured articles.

Taggant materials or particles can be mixed into bulk products (foods, explosives, pharmaceuticals, paper, polymers), applied to the surface of articles, or incorporated into inks, paints, or coatings.

A relatively small amount of optically or electronically readable information can be carried by the taggant materials and larger amounts of information can be distributed among a multiplicity of taggant materials.

2. Description of Related Art

Low viscosity polymer materials can be precisely formed by casting or molding against a master tool bearing a microstructured pattern. Under suitable process conditions the polymer article thus formed will retain an accurate impression of the microstructure pattern of the mold. Cast or molded polymeric articles are commonly manufactured at large scale, with dimensions ranging from millimeters to meters.

In contrast, the dimensions of the subject invention are in the micrometer range, typically between one micron and 500 microns in their largest dimension. An exemplary taggant material or particle of the present invention might be roughly fifty microns in diameter and ten microns thick.

BRIEF SUMMARY OF THE INVENTION

The subject invention is to manufacture micron-scale identical polymer objects, which we refer to herein as taggant particles, which can be dispersed into or onto an article as a means of verifying the article's authenticity. By micron-scale, it is meant polymer objects typically between one micron and 500 microns in their largest dimension. The taggant particles can be designed, for example, to have unique shapes, sizes, colors, coatings, indicia, optical functions, and electromagnetic functions to be used for the unique identification of another article. Furthermore, combinations of taggant particles can be used as a signature, or code, for identifying the article. In addition, a single taggant particle can combine a number of identifying properties to increase the accuracy of detection and authentication.

The taggant particles can carry information in human readable form, such as text or images, which can be authenticated by means of microscopic examination of the article. Scannable information, such as barcodes and data patterns, can also be carried by the taggant particles, thereby enabling optical detection and readout of the information. Digital information carried by such a taggant particle can be encrypted by a digital signature and can only then be read by a scanning device which is equipped to decrypt the signed information, thereby providing additional security and data privacy. A single taggant particle can combine a number of identifying properties to increase the accuracy of detection and authentication.

The quantity of information which can be carried by a single taggant particle is limited by a number of factors, including the readout wavelength of the scanning system and the size of the taggant particle, but the total quantity of information can be increased at will by dividing the information into smaller 'packets' that can be carried by any number of taggant particles. This approach is similar to the packet transmission protocol used on the Internet. As applied to taggant particles, the desired information is first fragmented into packets small enough to be carried on individual taggant particles along with a packet sequence number. The packet labeled taggant particles are then applied to the article to be authenticated.

Authentication of taggant particles is accomplished by scanning the article and reading the taggant sequence number and packet data, and storing this information in computer memory until multiple instances of all packets have been read. Reading errors are then corrected by comparing the packet data for the multiple instances of each packet sequence number and retaining the information held by the largest number of agreeing packets. The complete message can then be assembled by arranging the corrected packet data in packet sequence order. The packet labeled taggant particles thereby enable an article to be tagged with a large amount of information dispersed as packets across many small taggant particles.

Additional security can be obtained through the use of the packet labeled taggant particles in combination with packet information carried by the substrate itself. In this case the packet labeled taggant particles do not carry the complete message; some of the message packets are borne by the substrate. This further impedes counterfeiting attempts because both the substrate and the packet labeled taggant particles have to be copied and combined to create an article which will authenticate. Differences in the quantity, type, or encoding of the information carried by the substrate and carried by the packet labeled taggant particles can be used to detect counterfeiting attempts to incorporate all of the information into either the substrate or the taggant particles.

BRIEF DESCRIPTION OF THE DRAWING\S

DETAILED DESCRIPTION

Taggant particles according to this invention can be distinguished by a great variety of identification schemes, including size, shape, stencil perforation, surface embossment, imprinting, optical function, electromagnetic function, and combinations of two or more of these identification schemes.

Figure 4:
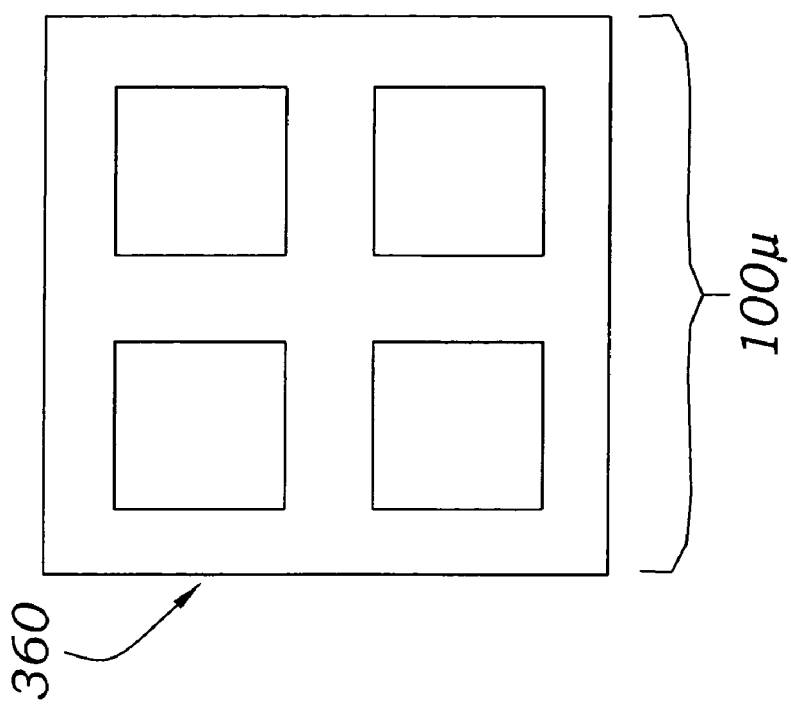
FIG. 4 illustrates similarly shaped taggant particles of varying size.
Figure 4:
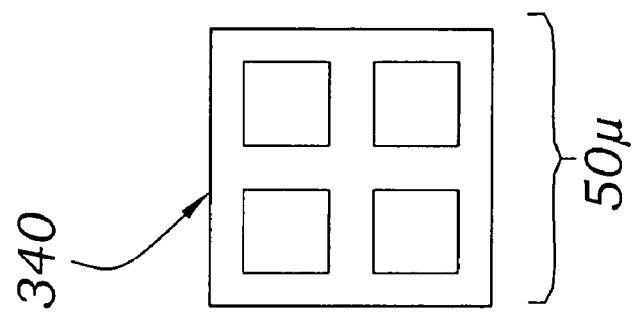
Figure 4:
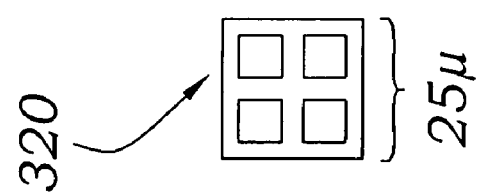
Figure 4:
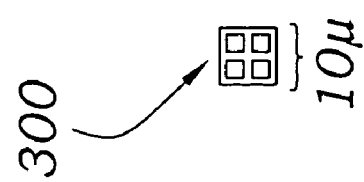

Taggant particles of any particular type, according to this invention, can be distinguished by size. For example: as illustrated in FIG. 4, a substantially square taggant particle having a pattern of four squares measuring 10μ (microns) in its longest dimension is easily distinguished through microscopic examination from similarly shaped taggant particles which are 25μ, 50μ, 100μ, or other size. Indicia or imprinted information can also be different in scale between taggant particles, thereby providing unique identification.

Figure 1A:
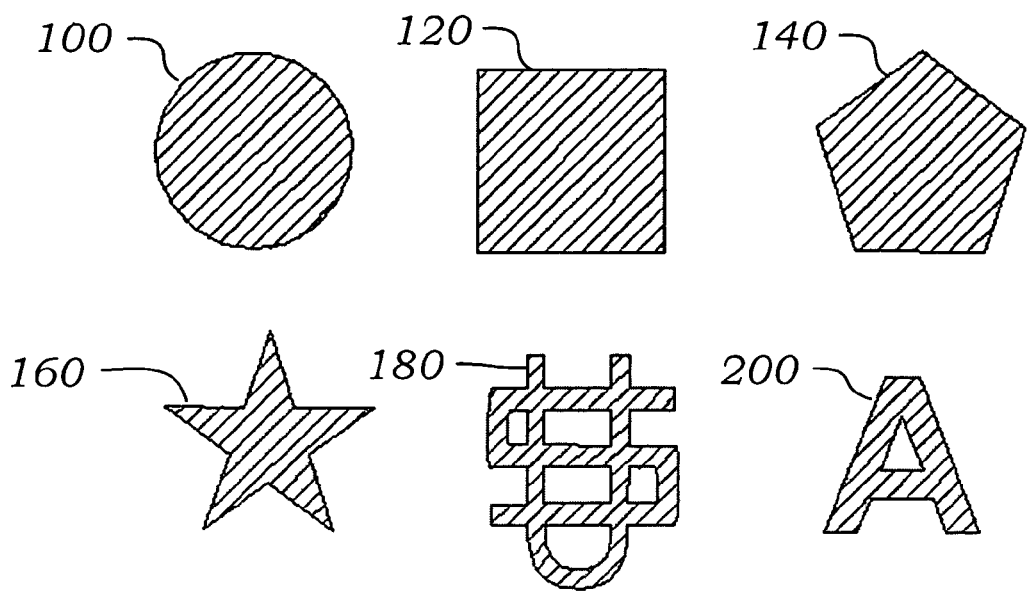
FIG. 1(A) is a plan view of a first embodiment according to the present invention illustrating taggant particles of different shapes.
Figure 1B:
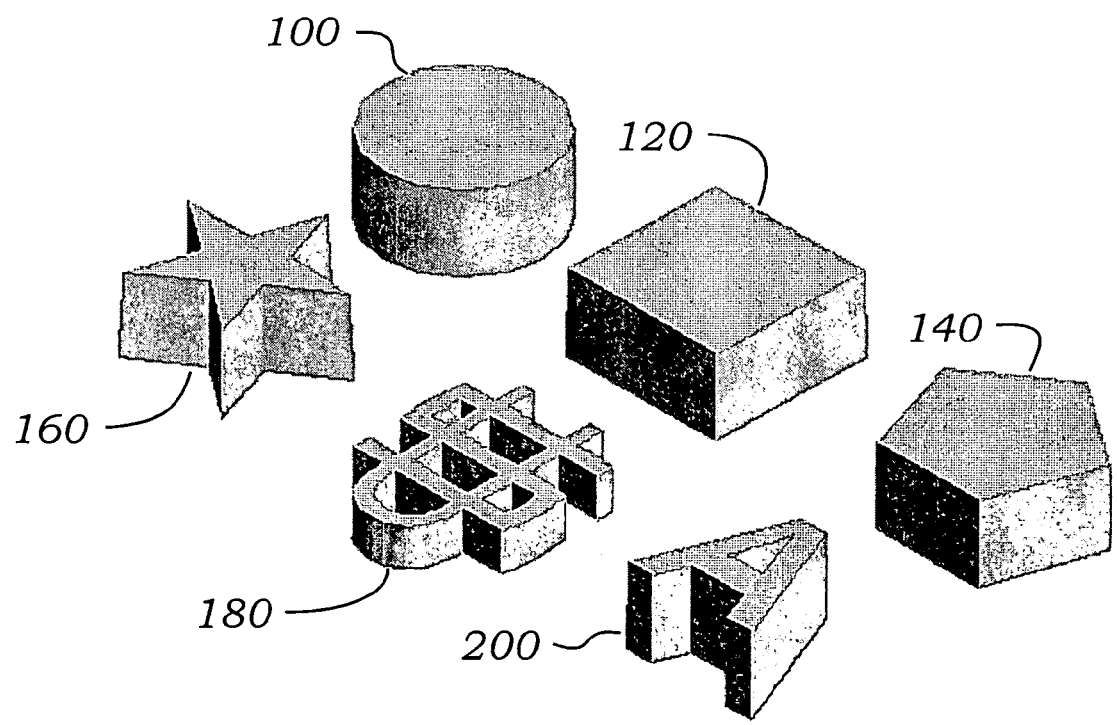
FIG. 1(B) is a perspective view of the taggant particles of FIG. 1(A).

As illustrated in FIGS. 1(A) and (B), the precise geometric shape of taggant particles according to this invention can be used for unique authentication. Generally the shape of interest will be the plan view, two dimensional projection of the taggant particle seen in FIG. 1(A). Exemplary shapes easily distinguished from one another that can be easily used as the shape of a taggant particle include: circle 100, square 120, pentagon 140, star 160, US symbol 180 and the letter A 200. Additional exemplary shapes (not shown) include: annulus, ellipse, triangle, rectangle, cross, bar, rhombus, concave and convex polygons, arbitrary designs, logos, and silhouettes of familiar objects.

The third dimension, the thickness dimension, of taggant particles according to this invention can also be uniquely engineered. Taggant particles can be flat, rounded, filleted, sculpted, and embossed to further enhance their value for authentication.

Figure 2:
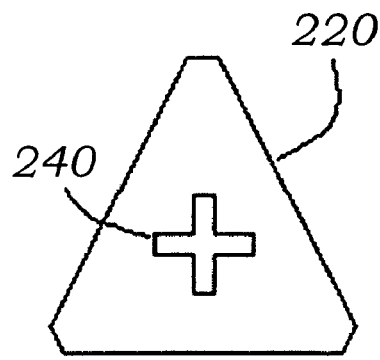
FIG. 2(A) is a plan view of an alternative embodiment of the present invention illustrating a perforated taggant particle.
FIG. 2(B) is a perspective view of the taggant particle of FIG. 2(A).
Figure 2:
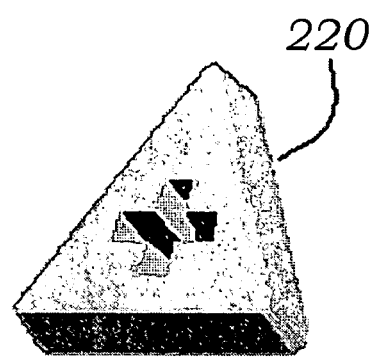

Another method for distinguishing taggant particles according to this invention is by partially or fully perforating the particles with holes of chosen shape and size or groups of such holes forming stencil patterns. FIGS. 2(A) and (B) illustrate one form of a stencil perforated taggant particle, showing the taggant particle body 220 and a cross-shaped, stencil perforated hole 240. Stencil perforated taggant particles can represent bitmap images, text, barcodes, data patterns, logos, and virtually any geometrical design.

Figure 3:
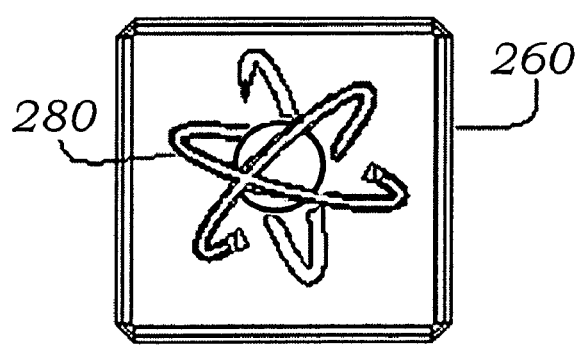
FIG. 3(A) is a plan view of another embodiment of the present invention illustrating an embossed taggant particle.
FIG. 3(B) is a perspective view of the taggant particle of FIG. 3(A).
Figure 3:
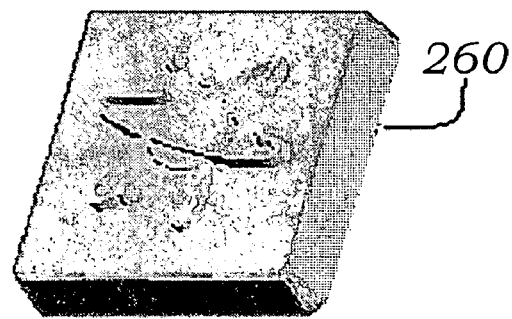

In like manner, the surface of taggant particles according to this invention can be designed to bear embossed patterns that present bitmap images, text, barcodes, data patterns, logos, and virtually any geometrical design. The surface embossment of these taggant particles may be raised (as the taggant particle 260 bearing a raised embossed surface pattern 280 illustrated in FIG. 3(A) and (B)), depressed, multilevel, or sculpted in bas relief.

Figure 5:
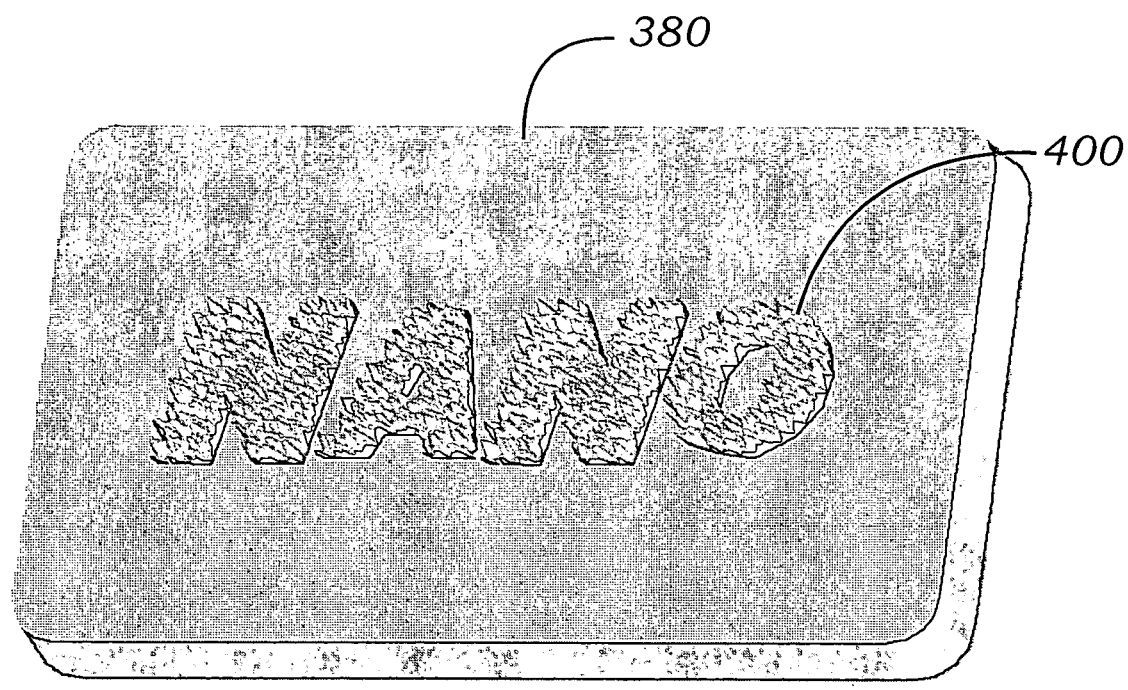
FIG. 5 is a perspective view of a further embodiment of the present invention illustrating imprinted taggant particles.
Figure 5:
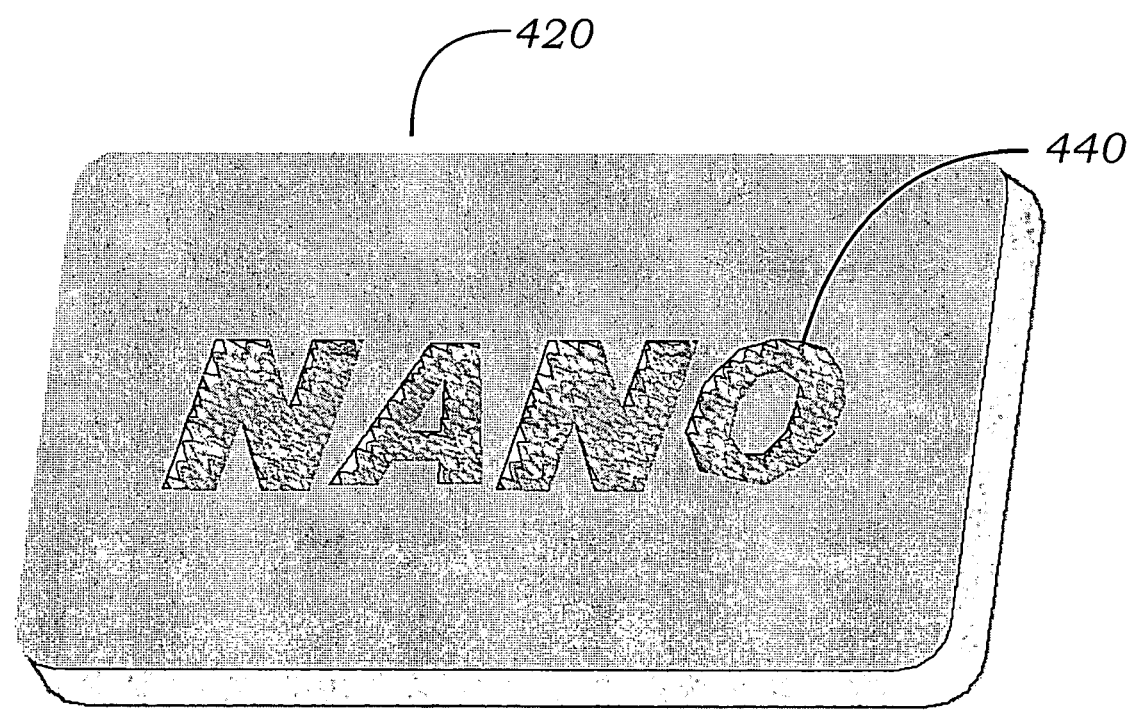
Figure 6:
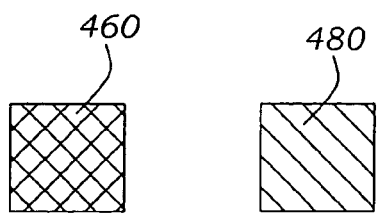
FIG. 6(A) illustrates yet a further embodiment of the present invention in the form of optically modified taggant particles having different colors.
FIG. 6(B) illustrates yet a further embodiment of the present invention in the form of optically modified taggant particles having a refractive index substantially different from and substantially identical to the refractive index of the medium in which they are dispersed.
FIG. 6(C) illustrates a cross-sectional view of yet a further embodiment of the present invention in the form of an optically modified taggant particle having a surface microstructure forming a pattern of dark zones therein.
FIG. 6(D) illustrates a cross-sectional view of yet a further embodiment of the present invention in the form of an optically modified taggant particle bearing a multilayer dielectric interference stack.
FIG. 6(E) illustrates a cross-sectional view of yet a further embodiment of the present invention in the form of an optically modified taggant particle bearing retroreflective microstructures.
FIG. 6(F) illustrates a cross-sectional view of yet a further embodiment of the present invention in the form of an optically modified taggant particle bearing a metallized diffractive surface microstructure.
FIG. 6(G) illustrates a cross-sectional view of yet a further embodiment of the present invention in the form of an optically modified taggant particle incorporating a planar optic system.
FIG. 6(H) is a perspective view of the taggant particle of FIG. 6(G).
Figure 6:
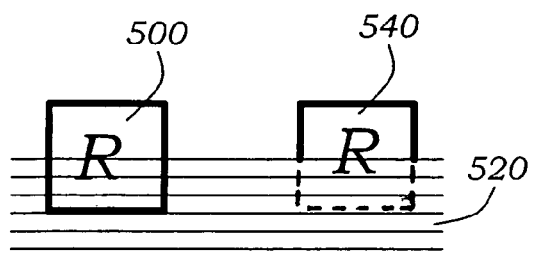
Figure 6:
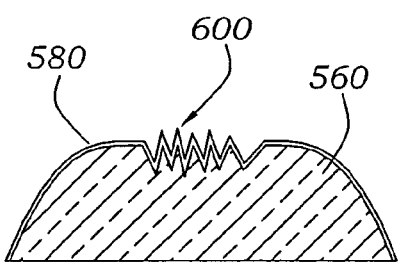
Figure 6:
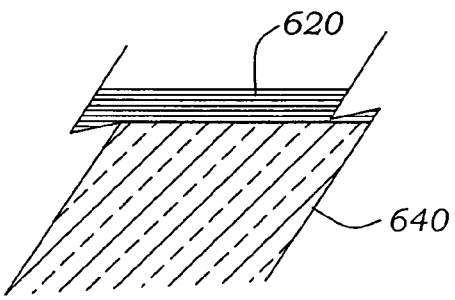
Figure 6:
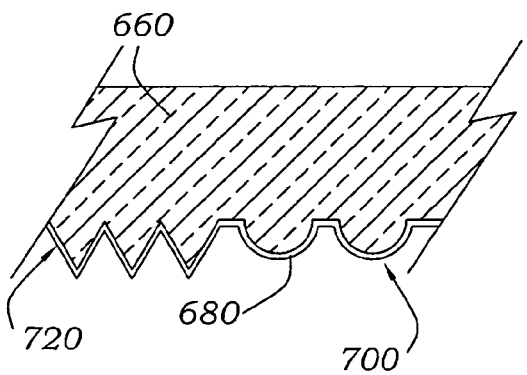
Figure 6:
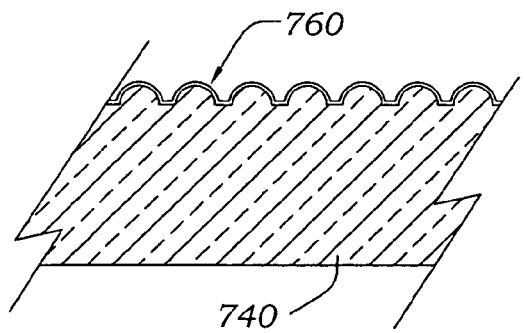
Figure 6:
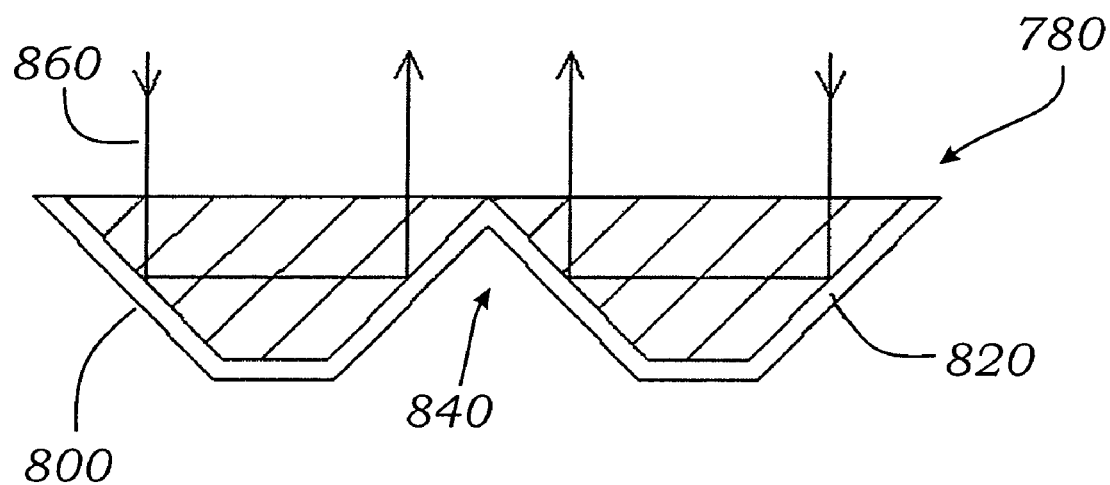
Figure 6:
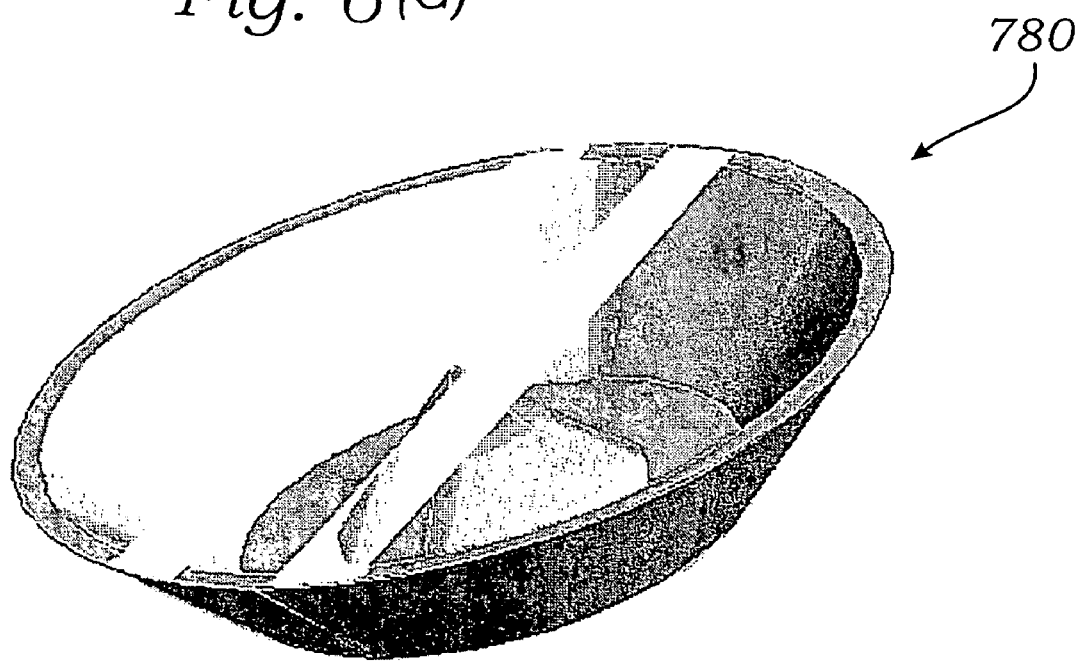
Figure 7:
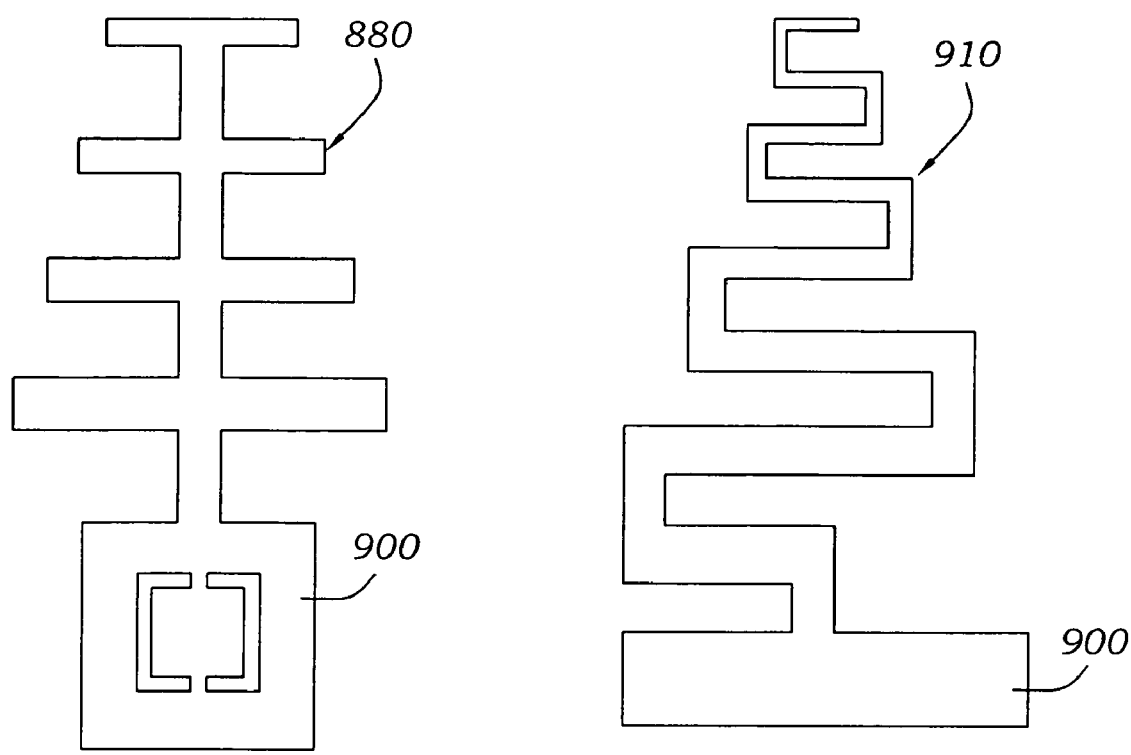
FIG. 7 is a plan view of another embodiment of the present invention in the form of taggant particles having selected electrical and/or magnetic properties.

Information can also be imparted to the taggant particles according to this invention by imprinting as illustrated in FIG. 5. Taggant particles can be web printed, screen printed, ink jet printed, pattern metallized, or embossed with a light absorbing microstructure such as what we call Optical Black or NanoBlack™ microstructures. Imprinting with Nano-Black™ microstructures enables extremely high resolution (up to 50,000 dots per inch), high contrast black and white information to be incorporated into the surface of taggant particles according to this invention. NanoBlack™ microstructure is a high aspect-ratio metallized microstructure which acts as a light trap by forcing incident light to undergo a multiplicity of glossy reflections between adjacent elements until substantially all of the reflected light has been absorbed. NanoBlack™ microstructures can be patterned into regions as small as one quarter of a micron, creating the effect of black pixels, while adjacent, smooth metallized surfaces appear reflective and white. NanoBlack™ microstructures thereby enable the effect of ultra-microprinting by means of microstructures instead of by ink. NanoBlack™ microstructures are described in more detail in co-pending U.S. application Ser. No. 10/351,285, filed Jan. 24, 2003, which is incorporated herein in its entirety as if fully set forth. In particular, they are described under the heading Metallized Replicated Microstructures for Absorbing Light, and alternatively described therein as light traps. As illustrated in FIG. 5, taggant particle 380 is printed on one surface by ink 400 and taggant particle 420 is imprinted by surface embossment with NanoBlack™ microstructures 440. FIG. 6(C) depicts a crosssectional view of a taggant particle 560 incorporating a NanoBlack™ surface microstructure 500 and a thin deposit of reflective metal 580, such as aluminum (not shown to scale).

As illustrated in FIGS. 6(A)-(G), taggant particles according to this invention can also be endowed with unique optical properties that can be easily detected for authentication. Taggant particles can be mixed into a dispersing medium, such as an ink base, polymer coating, or lacquer base, which has a particular optical index of refraction, as in FIG. 6(B). A transparent, untinted, unmetallized, non-imprinted taggant particle 540 having the same refractive index as the dispersing medium 520 becomes invisible when they are mixed into the dispersing vehicle. By imprinting information on taggant particles which are index matched to the index of the dispersing vehicle, the imprinted information will appear to float without support in the dispersing medium because the taggant particle itself will optically disappear. By tailoring the reflective index of the taggant particle to differ from that of the dispersing vehicle, a taggant particle can be rendered more easily seen. The degree to which the visibility of the taggant particle is increased depends on the difference in the index of refraction between the taggant particle and the vehicle. For some applications it may be desirable to make this index difference small so that the presence of the taggant particle can only be detected by phase contrast microscopy but not by conventional microscopy. For other applications is may be desirable to make the index difference large, so that they can be easily detected by conventional microscopes and by optical scanning methods. Taggant particle 500 has a refractive index substantially different from that of the dispersing medium 520, such that the taggant particle 500 and its imprinting (if present) remains visible when immersed.

Taggant particles according to this invention can also be tinted or colored by incorporating a pigment or dye into the base polymer. FIG. 6(A) illustrates taggant particles 460, 480 having different colors. In general, taggant particles colored in this manner will have a uniform color. Multiple layers of pigmented or dyed materials, either structured or unfeatured, can be built up to incorporate greater amounts of information into the taggant particles. Color selective microstructures can also be formed on the surface of a taggant particle to provide either uniform coloring or patternable color effects, including optically variable color effects and the presentation of images, text, and digital information.

Different metals can be deposited onto taggant particles according to this invention by, for example, sputtering, thermal evaporation, or plasma spraying, producing unique visual, optical, and magnetic effects. Taggant particles can be coated with aluminum, gold, chromium, nickel, and other metals to impart specific optical reflection spectra to them. Nickel, cobalt, iron, and alloys of these and other ferromagnetic metals can be deposited on formed polymer particles to produce taggant particles which have a unique magnetic or electromagnetic signatures. Highly conductive metals, such as gold, copper, silver, and aluminum and metals and metal alloys engineered to a specific electrical impedance can be used to coat taggant particles formed into micro antenna geometries to enable radio frequency induction and induced infrared emission for detection and authentication. As an example, FIG. 7 illustrates taggant particle micro-antennas 880 and 910 coated with a suitable metal 900 having desired electrical and magnetic properties.

As shown in FIG. 6(D), a multilayer dielectric stack interference filter coating 620 can also be used to customize a taggant particle 640 according to this invention. These coatings can be applied by, for example, sputtering, thermal evaporation, or solvent augmented wet coating methods. Dielectric stack interference filter coatings can be designed to have broadband or narrowband spectral reflectivity, providing yet another degree of freedom in for unique authentication of the taggant particles according to this invention.

Detection of taggant particles according to this invention can be facilitated by incorporating retro reflective optical structures into their form. These retro reflective optical structures can be of any of the well known geometries, including corner cube, spherical, and enhanced backscatter. Illumination of a surface containing retro reflective taggant particles will cause them to reflect light strongly back in the direction of illumination. Viewing the illuminated material from the same direction as the illumination will then reveal the taggant particles as bright spots of light against a darker background. FIG. 6(E) illustrates an exemplary taggant particle 660 incorporating hemispherical retroreflective microstructures 700, comer-tube retroreflective microstructures 720, and an optional metallization layer 680.

Additional optical effects can be incorporated into taggant particles according to this invention by diffractive microstructures. Holographic and computer generated hologram diffractive patterns can be used to form images in the reflected illumination. The optical intensity of the image thus formed can be controlled by the size and concentration of the taggant particles on the tagged article. Other diffractive surface relief structures can be incorporated which produce designed patterns of reflected diffractive orders, such as is produced by a Damann grating. These taggant particles can be authenticated by illuminating the tagged particle with a laser, laser pointer, LED illuminator, or other narrow bandwidth light source. FIG. 6(F) illustrates an exemplary taggant particle 740 bearing a metallized diffractive surface microstructure.

Effectively two-dimensional, planar optic systems can be created in polymer by forming waveguides and optical elements from materials having a different index from the polymer surrounding them. In some cases a shaped hole can be used to form an optical element, utilizing indexes of refraction of air or the dispersing medium to perform the refraction. A planar optic system incorporated into a taggant particle could be used, for example, to collect light falling on its periphery and to concentrate and redirect it to be emitted from the center of the taggant in a particular design or pattern. Such planar optic systems are described in more detail in co-pending U.S. Provisional application Serial No. 60/381,325 filed May 17, 2002 for which a conventional U.S. application was filed on or about May 16, 2003, which is incorporated herein in its entirety as if fully set forth. FIGS. 6(G) and (H) illustrate an exemplary taggant particle incorporating a planar optic system including peripheral reflector 800 and central reflector 840, optionally coated with metallization layer 800 which collects light 860 impinging on peripheral reflector 800 and focuses and concentrates it onto central reflector 840 which reflects the light back out of the taggant particle to provide a distinctive visual effect.

Compound optical systems, incorporating a plurality of optical elements, can be incorporated into taggant particles according to this invention to perform designed light control functions. Such a compound optical system may, for example, incorporate focusing elements, apertures, stops, images and patterns arranged such that the optic axis of the system is disposed substantially perpendicular to the base plane of the taggant particle and the optical elements are arranged along the optic axis at different distances from the base plane of the taggant particle. Compound optical systems incorporated into taggant particles according to this invention can be used to control the color and brightness of the particle as viewed from different angles and as illuminated from different angles. For example, a taggant particle incorporating a cylindrical lens in its top surface and an image of a black line against a white background (aligned with the long direction of the cylindrical lens) in its lower surface, with the distance between the lens and the image being substantially the same as the focal length of the lens, will appear to be dark when viewed from directly above but lighter when viewed from a more oblique angle. Such compound optical systems are described in more detail in co-pending U.S. application Ser. No. 10/351,285 filed Jan.

24, 2003 referenced above in relation to the NanoBlack™ microstructures, incorporated herein in its entirety as if fully set forth.

Figure 8:
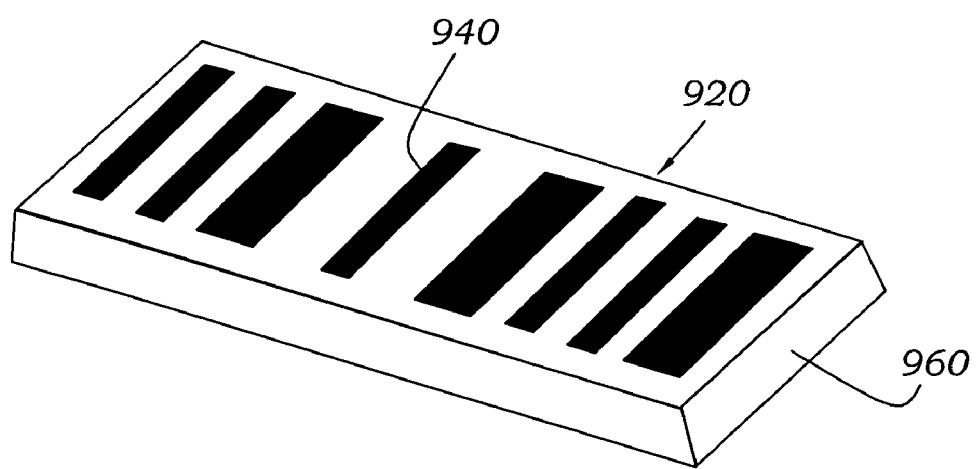
FIG. 8 is a perspective view of a taggant particle of the present invention having a combination of identifying features of the various embodiments.

Taggant particles according to this invention can incorporate combinations of the features listed above, either in multiple layers or on opposite sides of each tag. Thus a taggant particle could, for example, incorporate multiple layers of planar optics plus a diffractive optical surface structure. Another example of combining features is illustrated in FIG. 8 in which taggant particle 920 bears a particular size and shape as well as a NanoBlack™ microstructure barcode pattern 940, with a magnetically active metal deposition 960 having a high magnetic susceptibility. Virtually any combination of the foregoing listed features can be combined in a single taggant particle.

The range of applications for taggant particles according to this invention is nearly boundless. These taggants can be incorporated into inks for printing secure, counterfeit resistant, authenticatable currency, identification cards, financial transaction cards, vital records, and other high security, high value documents. The taggant particles can alternatively, or additionally, be incorporated into the paper and polymer substrates these documents are printed on. Such tagged materials can be used as labels for lot tracking, tamper prevention and indication, product authentication, covert barcoding, and distributed packetized authentication information.

These taggant particles can be incorporated into bulk products for authentication and lot tracking, including foods, chemicals, and explosives.

Taggant particles according to this invention can be manufactured from a base material consisting of inert polymers or biodegradable materials so that they can be ingested by humans and animals without harm. Suitable inert polymers for forming the taggant particles include polypropylene, polyethylene, and PMMA. Gold, platinum, and aluminum can be used to provide metallization, if desired. Gelatin, starch, and starch-based biopolymers can also be used to form the taggant particles. Inert, ingestible taggant particles can be used to authenticate foods and medicines.

Taggant particles according this invention can also be used as 'secret spy dust'. For example, anyone handling a high security document that has been dusted with taggant particles will be contaminated by those particles. Identification of those particles on a person, on their clothing, or on their furniture or home furnishings provides evidence that they have had contact with that document.

Methods for authenticating taggants made as described herein include use of an optical microscope, optical/laser (laser pointer) diffraction, micro laser scanning, bar code scanning, use of a video/computer microscope, magnetic field detection and electromagnetic induction, resonance, or emission.

Taggant particles according to this invention can be manufactured by molding molten or softened base material between a tool bearing the desired taggant structure and another surface, forming a closed cavity that the material solidifies within. Separation of the two surfaces exposes the taggant particle, which can then be removed from the surface it remains attached to.

Another method for manufacturing taggant particles according to this invention is to cast liquid monomers or oligimers into a closed cavity formed in the manner describe above, then to cause the liquid material to solidify by suitable means, such as by ionizing radiation. The taggant particles can then be removed as described above.

Metallization and other coating of the taggant particles is best performed after solidification but before the particle is removed from the second surface. In this case it may be desirable to form the taggant particle on a sacrificial sheet or web of material that can be removed from the taggant particle manufacturing system.

An additional method for manufacturing taggant particles according to this invention is to manufacture a continuous sheet or web of film bearing the desired surface microstructure patterns, then to die-cut the resulting sheet into small particles large enough to contain at least one complete instance of the surface microstructure.

All metal taggant particles according to this invention can be formed by directed metal deposition onto a polymer tool bearing posts which are capped by the desired taggant geometry. The deposited metal forms a thick layer on these caps and on the lands between the posts, but virtually no deposition on the sides of the posts. The metal caps can then be lifted off the posts as separate taggant particles.

Having now described the invention, it will be apparent to one of ordinary skill in the art that many changes and modifications can be made thereto without departing from the spirit or scope of the invention as set forth herein.

What is claimed is:

1. A taggant particle having identifying indicia, wherein the identifying indicia comprises a design imparted onto or into the surface of the taggant particle wherein said design is a metallized pattern engineered to have a specific electrical or electromagnetic impedance.

2. The taggant particle of claim 1 wherein identifying indicia is additionally imparted to the particle by forming a partial or full perforation in the particle, the perforation being in the form of a selected design.

3. The taggant particle of claim 1 further including a selected design imparted onto or into the particle by printing, pattern metallization, coating or embossing said design onto or into the surface of the particle, or by selection of a geometric shape.

4. The taggant particle of claim 1, wherein the taggant particle is formed of a biodegradable base.

5. The taggant particle of claim 1 wherein the particle has a dimension of about 500 microns or less.

6. The taggant particle of claim 1, wherein the taggant particle is mixed in a dispersing vehicle.

7. The taggant particle of claim 6, wherein the taggant particle has a substantially different index of refraction from the index of refraction of the dispersing vehicle.

8. The taggant particle of claim 6, wherein the taggant particle has a base material and the base material of the taggant particle and the dispersing vehicle have substantially the same index of refraction.

9. A metallized taggant particle of about 500 microns or less, the taggant particle being formed into a shape selected to provide a specific impedance to operate as an antenna.

* * * * *